United States Patent [19]

Komaki

[11] Patent Number: 5,039,846
[45] Date of Patent: Aug. 13, 1991

[54] FLAT AND FOLDABLE ELECTRIC APPLIANCE

[75] Inventor: Shigeki Komaki, Nara, Japan

[73] Assignee: Sharp Kabushiki Kaisha, Osaka, Japan

[21] Appl. No.: 513,876

[22] Filed: Apr. 24, 1990

[30] Foreign Application Priority Data

May 1, 1989 [JP] Japan .................. 1-51728[U]

[51] Int. Cl.$^5$ .............................................. G06C 5/02
[52] U.S. Cl. ................ 235/1 D; 235/145 R; 200/5 A; 364/708
[58] Field of Search ............ 235/1 D, 1 R, 145 R; 200/5 A, 293, 303; 364/707, 708

[56] References Cited

U.S. PATENT DOCUMENTS

| | | | |
|---|---|---|---|
| 4,264,962 | 4/1981 | Kodaira | 364/707 |
| 4,517,660 | 5/1985 | Fushimoto et al. | 364/708 |
| 4,825,395 | 4/1989 | Kinser, Jr. et al. | 364/708 |
| 4,882,471 | 11/1989 | Kai | 235/1 D |

FOREIGN PATENT DOCUMENTS 60-25618 8/1985 Japan .
62-147022 9/1987 Japan .

Primary Examiner—Benjamin R. Fuller

[57] ABSTRACT

A flat and foldable electronic appliance which comprises a generally rectangular first flat casing having a pocket defined therein for accommodating a card for expansion of functions; a generally rectangular second flat casing similar in shape to the first flat casing and having a plurality of operating keys; a bridge member including at least two hinge joints for pivotably connecting the first and second flat casings together, one of the first and second flat casing being pivotable between folded and unfolded positions relative to the other of the first and second flat casings; and a generally cylindrical battery chamber provided on a portion of the bridge means other than the hinge joints. The generally cylindrical battery chamber is of a volume sufficient to accommodate therein at least one AA-size battery for powering electric and electronic circuits in the appliance and has a peripheral wall which is so curved as to follow the path of movement of such one of the first and second flat casings relative to the other of the first and second flat casings.

4 Claims, 3 Drawing Sheets

FLAT AND FOLDABLE ELECTRIC APPLIANCE

BACKGROUND OF THE INVENTION

1. Field of the Invention

The present invention relates to a flat and foldable, wallet-sized multi-functional electric appliance such as, for example, an electronic organizer, electronic telephone directory and schedule memo, electronic directory, electronic diary or electronic calculator, or an IC card reader. 2. Description of the Prior Art A hand-held electronic calculator in its early days was a single-functional tool as its nomenclature speaks. It could not have all, but one function of performing arithmetic calculations, and the subsequent version had an added function of a clock. However, the hand-held electronic calculator currently placed on the market is available in a number of variants ranging from a traditional single-functional calculator to a sophisticated multi-functional calculator. The hand-held multi-functional electronic calculator is called in different ways, such as listed above, depending possibly on the manufacturer's marketing strategy and/or the way of use recommended by the manufacturer.

Although the present invention is applicable to any variant of electronic calculator, it is particularly concerned with the electronic calculator of a type which is of a size generally equal to that of a wallet or a checkbook clutch and is yet flat and foldable, comprising generally rectangular first and second flat casings hingedly connected thereof such that one of the first and second casings can be pivoted between folded and unfolded positions relative to the other of the first and second casings.

The flat and wallet-sized electronic calculator has a size limited in favor of the portability and is, on the other hand, required to have both an expandability of system functions and a multi-functional capability. An example of the prior art electronic calculator of the type referred to above is shown in FIGS. 5 to 7 for the discussion of the prior art relevant to the present invention.

FIG. 5 illustrates the prior art electronic calculator in plan view with the first and second casings held in the unfolded position, FIG. 6 is a cross-sectional view taken along the line A—A in FIG. 5, and FIG. 7 is an endwise view of the electronic calculator showing the manner in which one of the first and second casings can be pivoted relative to the other of the first and second casings.

As shown in FIGS. 5 to 7, the prior art electronic calculator comprises lefthand and righthand flat casings 1 and 2 of generally rectangular configuration pivotally connected together by means of hinge joints 3 each including a hinge pin 4. One of the lefthand and righthand flat casings, for example, the righthand flat casing 2, is pivotable, about a hinge axis defined by the axially aligned hinge pins 4, relative to the lefthand flat casing 1 between a folded position, as shown by the phantom line in FIG. 7, and a unfolded position as shown in FIG. 5 and as shown by the solid line in FIG. 7. The lefthand casing 1 has a card slot 6 defined at one end thereof for receiving therein a selected one of memory cards 5 and also has a function-expanding transparent touch-key pad 7, an I/F take-out mouth 9, a liquid crystal display 8, a lock knob 10 for locking the memory card 5 inserted into the card slot 6 and an eject knob 11 for ejecting the memory card 5 out from the card slot 6.

On the other hand, the righthand flat casing 2 has an inner surface formed with a plurality of keys 12 which are electrically connected with circuits in the lefthand flat casing 1 through a flexible connection 14 having a bundle of wirings. The functions available from the electronic calculator can be expanded by selecting one of the memory cards 5.

The electronic calculator when in use has its lefthand and righthand flat casings 1 and 2 spread open as shown in FIG. 5, however, the lefthand and righthand flat casings 1 and 2 are folded together when the electronic calculator is not in use as shown by the phantom line in FIG. 7 to enhance the portability.

While demands are steadily increasing for this type of electronic calculator to have added functions and also to have an increased storage capacity, the consequence is that the number of component parts tends to increase, accompanied by an increase of an electrical power consumption to such an extent that the electric power available from one or more coin-type flat batteries 13 such as, for example, lithium cells, would no longer support all necessary power requirements for a substantial period of time. Accordingly, the use of one or two AA-size batteries appears to be feasible, however, the prior art flat electronic calculator has no space for accommodating such batteries.

Where the high-capacity batteries are desired to be used in the flat electronic calculator, the electronic calculator must have an increased size and/or an increased thickness. Increase in size and/or thickness may result in a reduction in portability of the electronic calculator.

Other than the electric appliance shown in and discussed with reference to FIGS. 5 to 7, the Japanese Laid-open Utility Model Publication No. 62-147022, published Sept. 17, 1987, disclose a similarly flat and foldable electronic calculator comprising generally rectangular first and second flat casings hingedly connected at one side edge with each other. A battery chamber is defined along the opposite side edge of the first flat casing remote from the hinged connection so as to extend completely through the length of the associated flat casing. The provision of the battery chamber according to this publication has necessitated the use of the first flat casing having a width greater than that of the second flat casing by a distance corresponding to the outer diameter or width of the battery chamber.

Also, the Japanese Utility Model Publication No. 60-25618, first laid open to public on Feb. 21, 1981, discloses a hand-held foldable electronic calculator comprising generally rectangular first and second flat casings hingedly connected with each other in end-to-end fashion. Specifically, the first flat casing has a pair of annular hinge lugs protruding outwardly therefrom, and the second flat casing has a tubular housing integrally formed therewith. The first and second flat casings are hingedly connected together with the tubular housing sandwiched between and axially aligned with the annular hinge lugs, the tubular housing defining a chamber for accommodating a bundle of connecting wirings used to connect electric circuit parts in the first flat casing with those in the second flat casing, not for accommodating a battery, in a twisted fashion such that one of the first and second flat casings can be resiliently urged towards an unfolded position relative to the other of the first and second flat casings.

SUMMARY OF THE INVENTION

The present invention has been devised with a view to substantially eliminating the above discussed problems and is intended to provide an improved flat and foldable electronic appliance which need not be increased in size for accommodating at least one high-capacity battery.

To this end, the present invention provides a flat and foldable electronic appliance which comprises a generally rectangular first flat casing having a pocket defined therein for accommodating a card for expansion of functions, a generally rectangular second flat casing similar in shape to the first flat casing and having a plurality of operating keys, a bridge means including at least two hinge joints for pivotably connecting the first and second flat casings together, one of the first and second flat casing being pivotable between folded and unfolded positions relative to the other of the first and second flat casings, and a generally cylindrical battery chamber provided on a portion of the bridge means other than the hinge joints. The generally cylindrical battery chamber has a peripheral wall which is so curved as to follow the path of movement of said one of the first and second flat casings relative to the other of the first and second flat casings.

According to the present invention, since the peripheral wall of the battery chamber is so curved as to follow the path of movement of one of the first and second flat casings between the folded and unfolded positions relative to the other of the first and second flat casings, the battery chamber can have an outer diameter substantially equal to the sum of respective thicknesses of the first and second flat casings while representing a generally cylindrical configuration sufficient to accommodate at least one AA-size battery.

Also, since the one of the first and second flat casings undergoes a pivotal motion between the folded and unfolded positions relative to the other of the first and second flat casings and along the outer peripheral surface of the wall defining the battery chamber, the first and second flat casings can be smoothly folded together. The electric appliances with the first and second flat casings folded together can have a size and a thickness both comparable to those of the prior art electric appliance of similar kind.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 5:
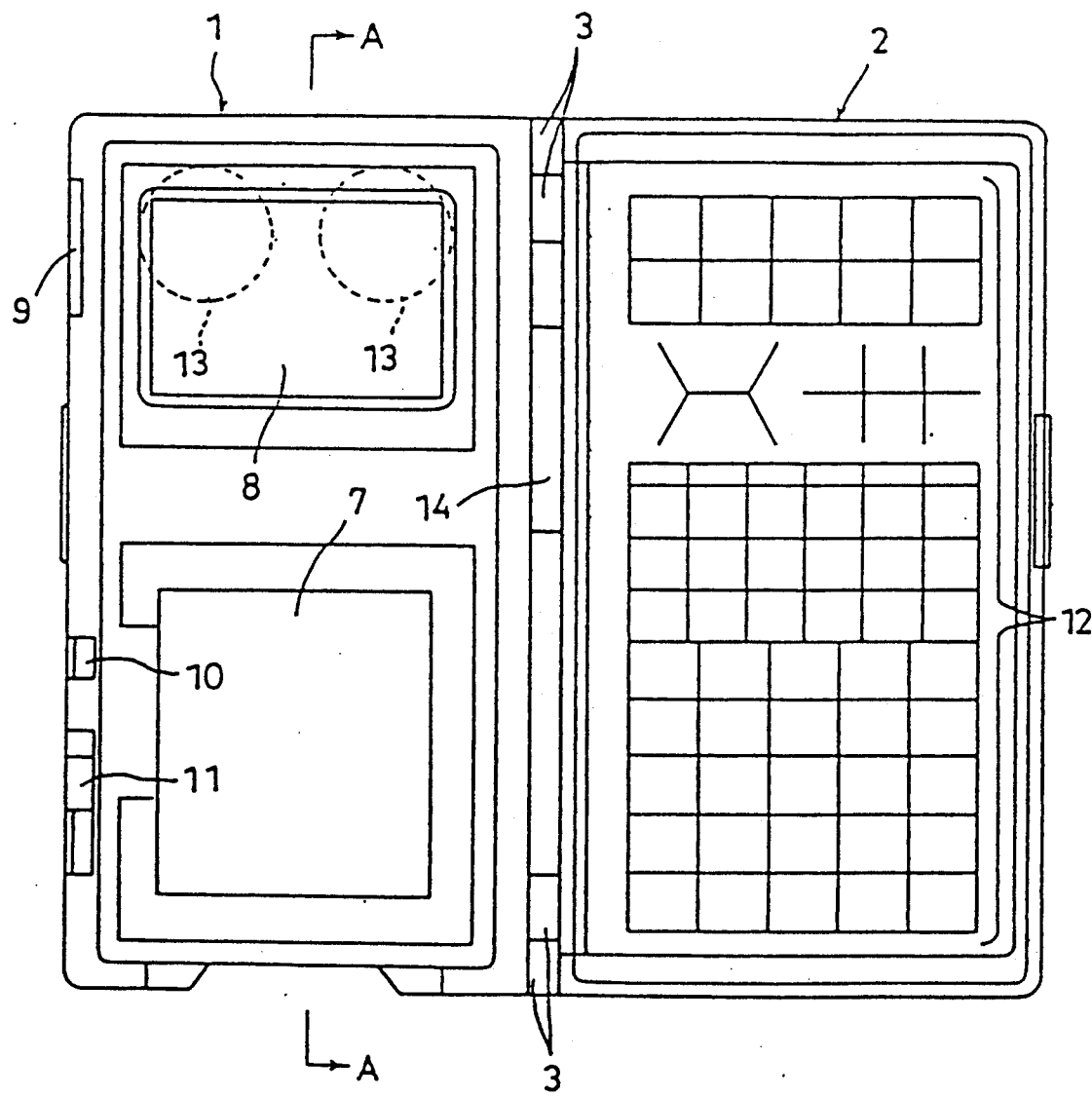
FIG. 5 is a view similar to FIG. 1, showing the prior art electronic calculator of a similar kind.
Figure 6:
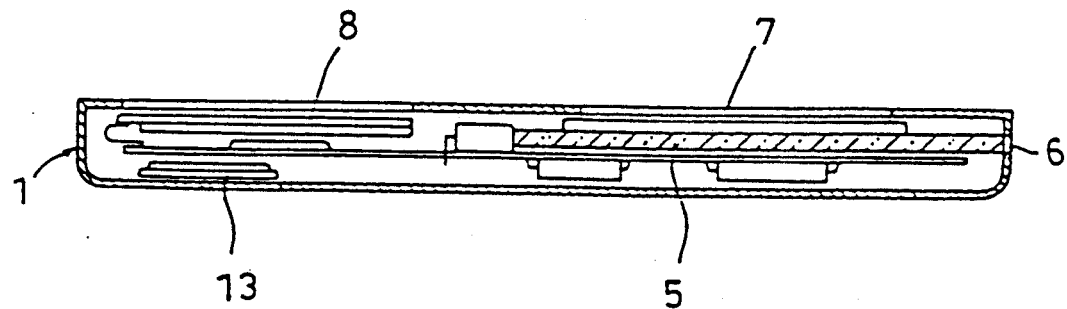
FIG. 6 is a cross-sectional view taken along the line A—A in FIG. 5.
Figure 7:
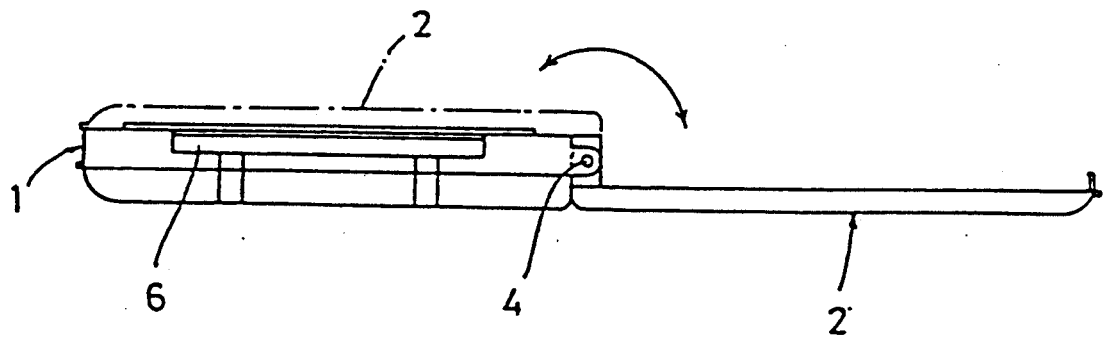
FIG. 7 is a view similar to FIG. 3, showing the prior art electronic calculator of FIG. 5.

Before the description of the preferred embodiment of the present invention proceeds, it is to be noted that the electronic calculator shown in FIGS. 1 to 4 is substantially similar to that shown in FIGS. 5 to 7 and therefore those parts comprising the electronic calculator of the present invention which function similarly to those parts in the prior art electronic calculator will be identified with like reference numerals and will not be further discussed.

Figure 1:
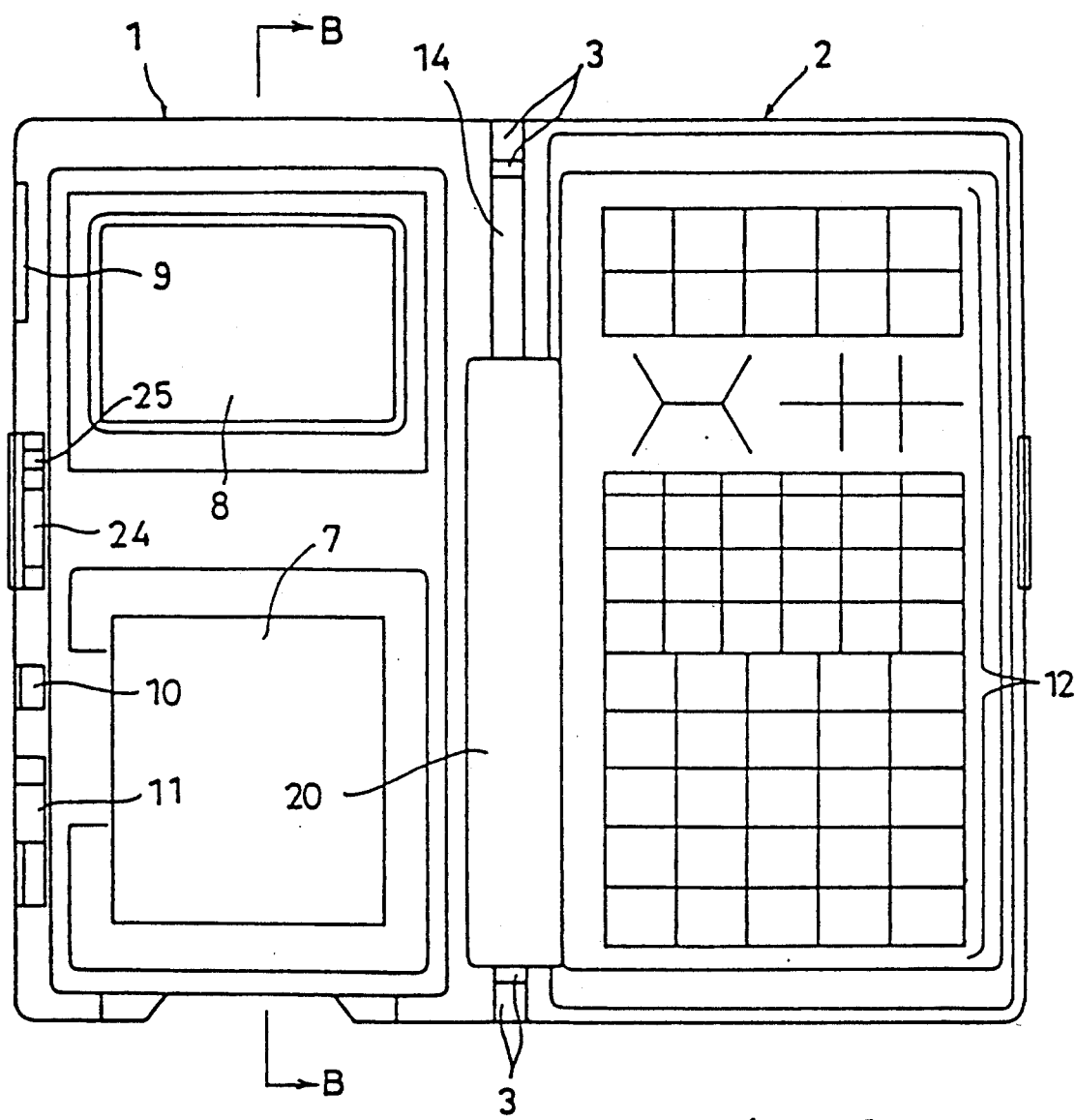
FIG. 1 is a top plan view of a flat and foldable electronic calculator according to the present invention with lefthand and righthand flat casings unfolded.
Figure 2:
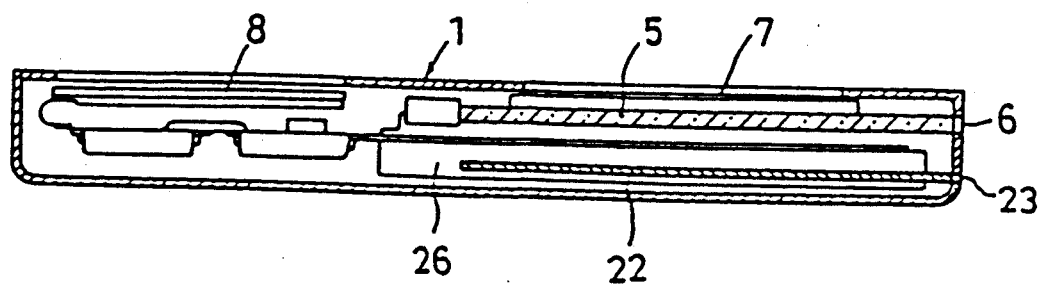
FIG. 2 is a cross-sectional view taken along the line B—B in FIG. 1.
Figure 3:
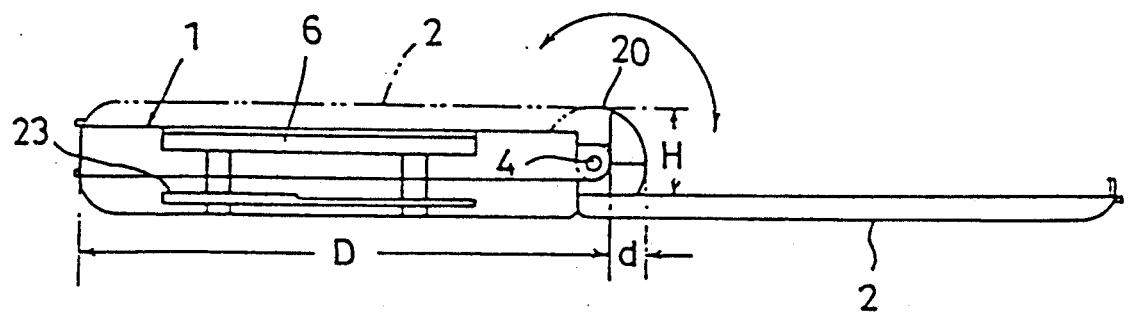
FIG. 3 is an endwise view of the electronic calculator shown in FIG. 1.

Referring now to FIGS. 1 to 3, a connecting bridge connects the lefthand and righthand flat casings 1 and 2 together in side-by-side fashion. A portion of the connecting bridge other than the hinge joints 3 and the flexible connection 14 includes a generally cylindrical battery chamber 20 which is integrally formed with the lefthand flat casing 1. This battery chamber 20 is of a size sufficient to accommodate therein at least one AA-size battery 21 and has an outer diameter substantially equal to the sum of respective thicknesses of the lefthand and righthand flat casings 1 and 2. A peripheral wall defining the battery chamber 20 has an outer surface so curved and so configured as to follow the path of angular movement of the righthand flat casing 2 relative to the lefthand flat casing 1 between the folded and unfolded positions.

Consequent upon the formation of the battery chamber 20 in that portion of the connecting bridge between the lefthand and righthand flat casings 1 and 2, and as can readily be understood from the comparison of FIG. 2 with FIG. 6, various electric and electronic component parts which, in the prior art electronic calculator, have been installed within the lefthand flat casing 1 beneath the pocket for accommodating the memory card 5 as shown in FIG. 6, are installed in that space within the lefthand flat casing 1 which has been occupied by the coin-type battery 13 in the prior art electronic calculator. Also, an IC card mounting unit 26 including an IC card slot 23 for accommodating an IC card 23 is formed in the space within the lefthand flat casing 1 beneath the memory card accommodating pocket which has originally been occupied by the electric and electronic component parts. Incident to the provision of the IC card mounting unit 26 in the lefthand flat casing 1, a lock knob 24 for the IC card 22 and an eject knob 25 for ejecting the IC card 22 out from the IC card slot 23 are provided in the lefthand flat casing 1 of the electronic calculator embodying the present invention.

Thus, the flat and foldable electronic calculator according to the illustrated embodiment has the battery chamber 20 for accommodating the high-capacity battery 21 and can have the electric and electronic component parts installed in that space of the lefthand flat casing 1 which has been occupied by the battery 13 in the prior art electronic calculator of similar kind, the electronic calculator embodying the present invention can have an increased number of functions and also an increased capacity. In addition, the provision of the generally cylindrical battery chamber 20 between the lefthand and righthand flat casings 1 and 2 allows the space in the prior art electronic calculator, which has been occupied by the electric and electronic component parts, to be emptied and, therefore, the IC cards mounting unit 26 for the IC card 23, which could have in no way be accommodated in the prior art electronic calculator, can be installed in the electronic calculator according to the present invention.

Figure 4:
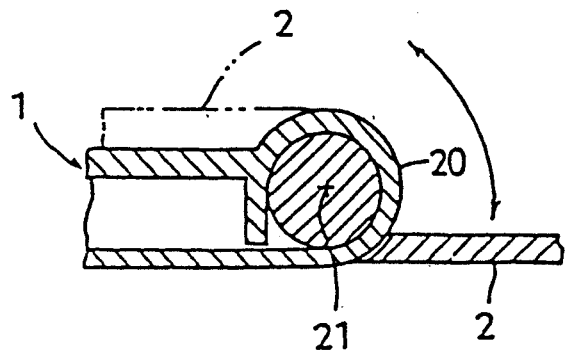
FIG. 4 is a fragmentary sectional view of a hinge joint between the lefthand and righthand flat casings.

Also, as hereinbefore described, the outer peripheral surface of the peripheral wall defining the battery chamber 20 is so curved and so shaped as to represent an arcuate shape conforming to the path of angular movement of the righthand flat casing 2 while the battery chamber 20 has an outer diameter generally equal to the sum of the respective thicknesses of the lefthand and righthand flat casings which are folded together. Accordingly, when the righthand flat casing 2 is to be pivoted about the hinge axis defined by the axially aligned hinge pins 4 as shown in FIGS. 3 and 4, a side edge portion of the righthand flat casing adjacent to and extending parallel to the battery chamber 20 will not be obstructed by the battery chamber 20.

Moreover, the thickness indicated by H in FIG. 3 in the electronic calculator embodying the present invention is substantially equal to that in the prior art electronic calculator, however, the width thereof is greater than the width D of the prior art electronic calculator by a distance d corresponding to the radius of the battery chamber 20. This increase in width would not adversely affect the portability of the electronic calculator embodying the present invention.

As hereinbefore fully described, the flat and foldable electric appliance according to the present invention is rationalized in that there is provided a generally cylindrical battery chamber on that portion of the bridge means connecting the lefthand and righthand flat casings other than the hinge joints, which chamber has a peripheral wall so shaped and so configured as to follow the path of movement of the righthand flat casing relative to the lefthand flat casing. Accordingly, with no need to increase the size and also the number of component parts, the battery chamber capable of accommodating the high capacity battery can be formed in the electric appliance, allowing the battery chamber in the prior art electric appliance to be used for another purpose without adversely affecting the portability and the enhancement of both multi-functional features and high capacity feature.

With the invention having been described, it is to be noted that various changes and modifications are apparent to those skilled in the art. For example, the present invention is particularly suited for application in an electronic system notebook or an IC card reader. Such changes and modifications are to be understood as included within the scope of the present invention as defined by the appended claims, unless they depart therefrom.

What is claimed is:

1. A flat and foldable electronic appliance which comprises:
   a generally rectangular first flat casing having a pocket defined therein for accommodating a card for expansion of functions;
   a generally rectangular second flat casing similar in shape to the first flat casing and having a plurality of operating keys;
   a bridge means including at least two hinge joints for pivotably connecting the first and second flat casings together, one of the first and second flat casing being pivotable between folded and unfolded positions relative to the other of the first and second flat casings; and
   a generally cylindrical battery chamber provided on a portion of the bridge means other than the hinge joints;
   said generally cylindrical battery chamber having a peripheral wall which is so curved as to follow a path of movement of said one of the first and second flat casings relative to the other of the first and second flat casings.

2. The appliance as claimed in claim 1, wherein said battery chamber has an outer diameter substantially equal to a sum of respective thicknesses of the first and second flat casings.

3. The appliance as claimed in claim 1, wherein said appliance is an electronic system notebook or an IC card reader.

4. The appliance as claimed in claim 1, wherein said battery chamber is so sized as to accommodate an AA-size battery.

* * * * *